United States Patent

James

Patent Number: 5,324,100
Date of Patent: Jun. 28, 1994

[54] HUB ASSEMBLIES

[76] Inventor: Kenneth W. James, Whitehall, Mynyddbach, Chepstow, Gwent, Great Britain

[21] Appl. No.: 54,421

[22] Filed: Feb. 11, 1993

[30] Foreign Application Priority Data

Feb. 15, 1992 [GB] United Kingdom ............... 9203247

[51] Int. Cl.⁵ .............................................. B60B 27/00
[52] U.S. Cl. .............................. 301/110.5; 301/105.1; 192/64; 474/160
[58] Field of Search ............... 301/105.1, 110.5, 124.1, 301/124.2, 137; 192/64; 474/160; 384/129, 261, 262

[56] References Cited

U.S. PATENT DOCUMENTS 4,116,319  9/1978  Nagano et al. ...................... 192/64
4,567,973  2/1986  Butz ................................... 301/110.5 X

FOREIGN PATENT DOCUMENTS 1027817   5/1953   France ..................... 474/160
666454    7/1988   Switzerland .
204564   10/1923   United Kingdom .
1582746   1/1981   United Kingdom .
2145675   4/1985   United Kingdom .
WO89/04258 5/1989  World Int. Prop. O. .

*Primary Examiner*—Russell D. Stormer
*Attorney, Agent, or Firm*—Young & Thompson

[57] ABSTRACT

A hub assembly for a bicycle wheel comprises a tubular body part having two spaced flanges for connection to the spokes of the wheel. A tubular sprocket carrier support extends from one end of the body part, and surrounding the sprocket carrier support is a carrier on which axially spaced toothed sprockets are mounted. The carrier is rotatable in one direction relatively to the hub to provide a free-wheel. The bearing between the carrier and the support is a plain bearing to minimise the diameter of the carrier and support, and thus permit smaller sprocket wheels to be employed. The hub bearing sets are so dimensioned that they may both be inserted from the same end of the body part.

14 Claims, 2 Drawing Sheets

FIG. I.

HUB ASSEMBLIES

BACKGROUND OF THE INVENTION

The present invention relates to hub assemblies, and particularly to hub assemblies for bicycle wheels.

Lightweight bicycle components improve the efficiency and performance of the bicycle to which they are fitted. In many cycling activities, and particularly in competition racing, even small reductions in the weight of components are regarded as highly significant. One part of the bicycle for which it is desirable to produce lightweight components, while maintaining sufficient strength and reliability, is the bicycle drive system, which includes the rear wheel hub, the chain, the derailleur, the chain rings which drive the chain, and the sprockets which are attached to the hub and driven by the chain.

In order to reduce the weight of the drive system it is desirable to use sprockets which are as small as possible. Smaller sprockets are of course lighter, but they also produce higher gear ratios for any given size of chain ring, and this may also enable the size and weight of the chain rings to be reduced. Because the sprockets are of smaller diameter than the chain rings, any reduction in the number of teeth on a sprocket produces a greater increase in gear ratio than would a corresponding reduction in the number of teeth on a chain ring. This means that significant reductions in size of the chain rings can be achieved for relatively modest reductions in size of the sprockets, while maintaining the same effective range of gear ratios.

Furthermore, the reduction in size of the sprockets and chain rings enables a shorter, and hence lighter, chain to be used and also makes it possible to reduce the size of derailleur which is required. Alternatively, if no reduction in the weight of the drive system is required, small sprockets can be used simply to increase the maximum gear ratio of the bicycle. It will be seen therefore that a large number of benefits can arise from sprockets having a small number of teeth. However, it has hitherto proved to be difficult to use a sprocket having less than twelve teeth with conventional bicycle hub assemblies.

One reason for this difficulty arises in the case where a free-wheel is required. In this case the sprockets are non-rotatably mounted on a sprocket carrier which is mounted on a sprocket carrier support by ball bearings, or sometimes needle bearings, to allow the carrier and sprockets to rotate relatively to the sprocket carrier support. A one-directional coupling, such as a pawl and ratchet device, is connected between the carrier and support to permit relative rotation between the sprockets and support in only one direction. The necessity of providing ball or needle bearings, and appropriate mountings for such bearings, between the carrier and carrier support means that, in practice, there is a minimum practical outer diameter for the sprocket carrier and consequently a minimum size for the smallest sprocket.

In one conventional type of hub assembly, the sprocket carrier support is formed in two separable parts: a main part on which the sprocket carrier is rotatably mounted, and an intermediate part which is integrally formed at one end of the main hub unit. These two parts of the support are formed with interengaging screw threads so that the main part, bearing the sprocket carrier and sprockets, may be attached to the hub unit by screwing it on to the intermediate part. When assembling the hub unit, therefore, it is necessary to pass one of the ball-bearing sets through the intermediate part of the sprocket carrier support. This imposes a minimum diameter on the intermediate support part and this may, in turn, impose a minimum diameter on the size of sprockets which can be used on the assembly.

In another known arrangement, the sprocket carrier support is omitted, and ball-bearing sets are located directly between the sprocket carrier and the axle. Again, however, the necessity of providing such ball-bearing sets imposes a minimum diameter on the sprocket carrier, and hence on the sprockets.

SUMMARY OF THE INVENTION

It is an object of the present invention to provide an improved hub assembly which may allow the use of smaller sprockets, having a smaller number of teeth than has generally been the case hitherto, and thereby achieve the advantages referred to above.

According to the invention there is provided a hub assembly for a bicycle wheel comprising: an elongate generally tubular body part having two axially spaced external peripheral flanges for connection to the spokes of the wheel; a generally tubular sprocket carrier support extending from one end of the body part; a generally tubular sprocket carrier surrounding the sprocket carrier support so as to be concentric therewith; the sprocket carrier having external locating means to locate on the carrier, so as to be non-rotatable relatively thereto, a plurality of axially spaced toothed sprockets; bearing means between the sprocket carrier and sprocket carrier support to permit rotation of the carrier relatively to the support; and one-directional coupling means between the carrier and support to permit relative rotation between the carrier and support in only one direction; said bearing means being a plain bearing comprising at least one internal cylindrical plain bearing surface on the sprocket carrier which is in close rotatable sliding engagement with a corresponding external cylindrical plain bearing surface on the sprocket carrier support.

Since the invention provides a plain bearing between the sprocket carrier and sprocket carrier support, space does not have to be provided for bearing sets and their supports and, accordingly, the diameter of the sprocket carrier support and carrier may be kept to a minimum. This enables the diameter of the smallest sprockets mounted on the carrier to be reduced, thus reducing the number of teeth thereon and giving the advantages previously referred to.

Said bearing means may comprise two internal cylindrical plain bearing surfaces, of different diameters, on the sprocket carrier.

The sprocket carrier support may be integral with the body part, forming an axial extension thereof, or it may be separately formed from the body part and in screw-threaded engagement therewith.

The body part, sprocket carrier support and sprocket carrier may be formed from titanium, and may be coated, at least in part, with titanium nitride.

The plain bearing surfaces of the sprocket carrier support and carrier may be coated with titanium nitride, chromium or nickel, and in the case of chromium or nickel the coating material may include a proportion of a solid lubricating material such as polytetrafluoroethylene or molybdenum disulphide. A titanium nitride coating may be applied on top of a chromium or nickel coating.

The assembly may include a passageway at least a part of which extends through the elongate generally tubular body part, first and second bearing receiving means being located within the passageway, at axially spaced locations, for receiving and holding respective bearing sets, the second bearing set being located adjacent the sprocket carrier support and having a smaller overall diameter than the first bearing set whereby, during assembly, the smaller second bearing set may be passed through the first bearing receiving means and into and along the passageway for engagement with the second bearing receiving means.

Said passageway may extend into the sprocket carrier support, said second bearing set then being located within the sprocket carrier support.

In any of the above arrangements said external peripheral flanges may be separately formed from the generally tubular body part and secured thereto.

The invention includes within its scope a sprocket assembly comprising a generally tubular sprocket carrier support having at one end thereof a screw thread for threaded engagement with one end of a generally tubular body part of a hub assembly; a generally tubular sprocket carrier surrounding the sprocket carrier support so as to be concentric therewith; the sprocket carrier having external locating means to locate on the carrier, so as to be non-rotatable relatively thereto, a plurality of axially spaced toothed sprockets; bearing means between the sprocket carrier and sprocket carrier support to permit rotation of the carrier relatively to the support; and one-directional coupling means between the carrier and support to permit relative rotation between the carrier and support in only one direction; said bearing means being a plain bearing comprising at least one internal cylindrical plain bearing surface on the sprocket carrier in close rotatable sliding engagement with a corresponding external cylindrical plain bearing surface on the sprocket carrier support.

The invention also provides a hub assembly for a bicycle wheel comprising an elongate body part, a sprocket carrier support extending from one end of the body part for supporting one or more sprockets for driving the wheel, a passageway extending through the sprocket carrier support and along the length of the body part for receiving an axle, and first and second bearing receiving means located at axially spaced locations within the passageway for receiving and holding respective bearing sets, the second bearing receiving means being located adjacent the sprocket carrier support and being adapted to receive a bearing set having a smaller overall diameter than the bearing set received by the first bearing receiving means so as to enable the smaller bearing set to be passed through the first bearing receiving means when the smaller bearing set is inserted into or removed from the passageway.

DETAILED DESCRIPTION OF THE PREFERRED EMBODIMENTS

Figure 1:
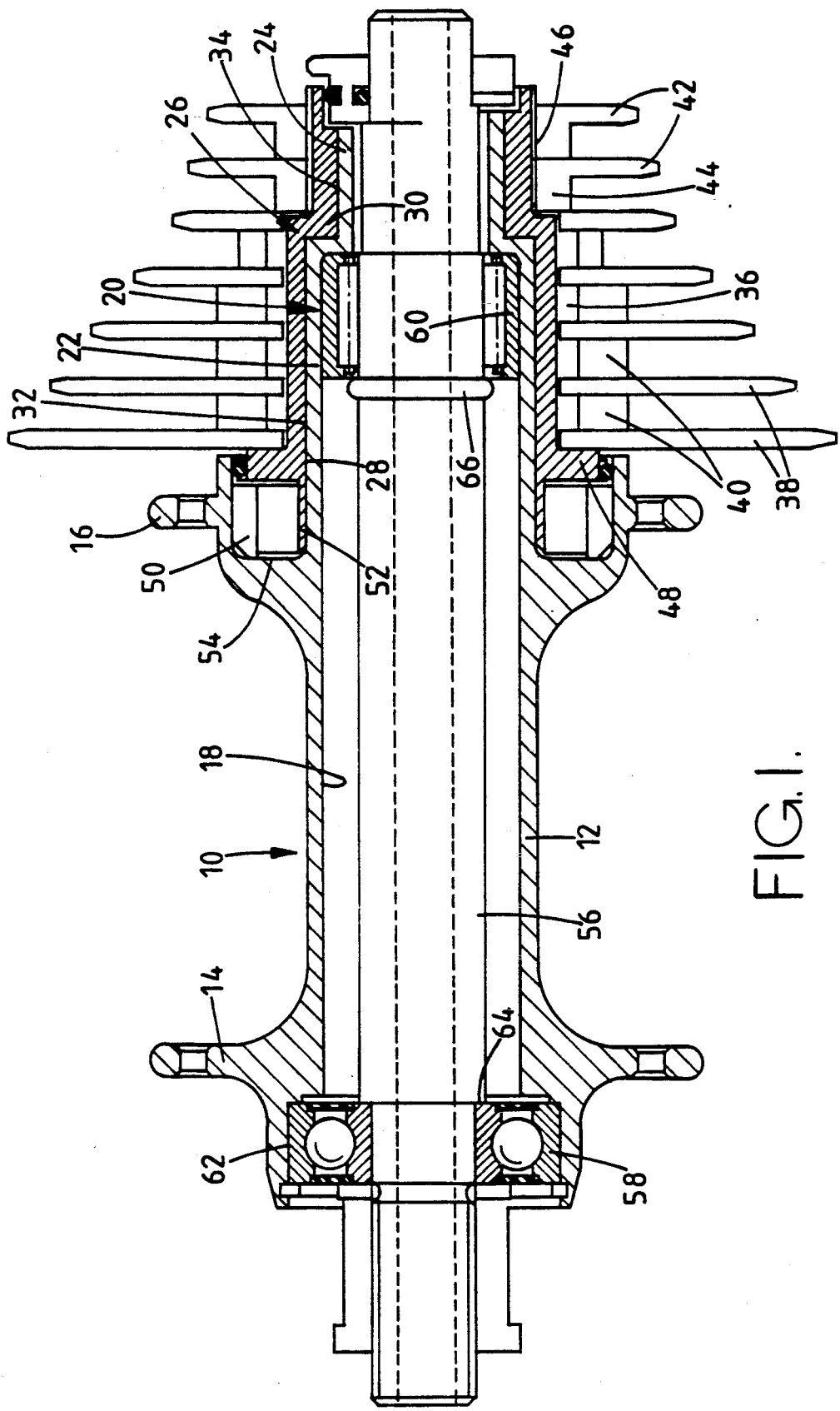
FIG. 1 is a longitudinal section through one form of bicycle hub assembly according to the invention.

Referring to FIG. 1: the hub assembly 10 comprises an elongate generally tubular body part 12 integrally formed with two axially spaced external peripheral flanges 14, 16 for connecting the assembly to the spokes (not shown) of the rear wheel of a bicycle. The body part has a central cylindrical passage 18 extending longitudinally thereof.

A sprocket carrier support 20 is integrally formed with the body part 12 and projects from one end thereof. The sprocket carrier support 20 comprises a first cylindrical portion 22 which is concentric with the body part 12 and the interior of which forms a continuation of the central passage 18 in the body part 12. The sprocket carrier support 20 also comprises a second smaller diameter portion 24.

Surrounding the sprocket carrier support 20 is a generally cylindrical sprocket carrier 26 which is formed with an internally stepped bore which matches the external shape of the sprocket carrier support 20. The external surfaces 28, 30 of the sprocket carrier support 20 constitute cylindrical plain bearing surfaces which are in close rotatable sliding engagement with the corresponding internal cylindrical plain bearing surfaces 32, 34 respectively on the sprocket carrier 26.

The larger diameter portion of the sprocket carrier 26 is formed with circumferentially spaced axial splines 36 which engage in corresponding recesses around the inner periphery of toothed sprockets 38 so as to locate the sprockets non-rotatably on the carrier 26. Axial spacing rings 40 are disposed between adjacent sprockets 38 in conventional manner.

Two further sprockets 42, with integral spacers 44, are in screw threaded engagement with an external screw thread 46 formed on the outer surface of the smaller diameter portion of the carrier 26. Screwing of the sprockets 42 on to the carrier serves to clamp the other sprockets 38 against a shoulder 48 on the end of the carrier 26 adjacent the body part 12.

The cylindrical plain bearing provided between the carrier 26 and support 20 enables the carrier to rotate freely on the support without the need for separate ball bearing or needle bearing sets between the carrier and support. The diameters of the support and carrier may therefore be kept to a minimum. To allow further reduction in the diameter of the smallest sprockets, they may be welded to the carrier or may even be integral with it.

In order to ensure that the carrier 26 can only rotate in one direction relative to the body part 12 and sprocket carrier support 20, and thus provide a freewheel arrangement, a pawl and ratchet device 50 (which may be of any known kind), or other suitable uni-directional device, is provided between an end portion 52 of the carrier 26 and an annular cavity 54 in one end of the body part 12 which overlaps the extension 52 on the carrier 26.

The passageway 18 extending along the length of the body part 12 and into the sprocket carrier support 20 receives an axle 56 the ends of which, in use, are clamped to the rear forks of the bicycle frame (not shown) in well known manner. The axle 56 is held in place within the hub by means of a ball-bearing set 58 and a needle bearing set 60. The ball-bearing set 58 is a force fit within an annular recess 62 in a thickened portion of the body part 12 adjacent one end thereof. The needle bearing set 60 is similarly a force fit within the end of the passage 18 adjacent the shoulder between the larger and smaller diameter portions of the sprocket carrier support 20. The bearing set 58 is located adjacent an annular shoulder 64 on the axle 56 and the bearing set 60 is similarly located adjacent an annular flange 66 on the axle. Nuts are secured to threaded end portions of the axle 56, in known manner, to mount the axle on the bicycle frame and to urge the inner races of the bearing sets firmly into engagement with the shoulder 64 and flange 66 respectively on the axle.

The external diameter of the needle bearing set 60 is smaller than that of the bearing set 58 so that it may pass along the full length of the passage 18 in the body part 12. The end of the passage 18 where the bearing set 60 is finally located is of slightly smaller diameter than the rest of the passageway, so as to permit the bearing set to pass freely along the passageway until it comes to its required location.

Thus, when it is necessary to assemble the hub, or to remove the axle 56, for example in order to lubricate or replace the bearing sets, the axle 56 together with the bearing set 60 is passed into or out of the passageway 18. An advantage of this "one-side" fitting is that the smaller diameter portion 24 of the sprocket carrier can be made comparatively small, and it can therefore support particularly small sprockets 42. In fact the internal diameter of the portion 24 is only limited by the required outside diameter of the axle 56.

The body part 12, sprocket carrier support 20 and carrier 26 may all be formed from titanium having a titanium nitride coating. On exposed parts of the hub assembly, the coating serves to protect and enhance the appearance of the exposed surfaces. However, coating of the bearing surfaces 28, 32 and 30, 34 between the sprocket carrier support and carrier with titanium nitride also serves to reduce the frictional resistance between those surfaces.

Alternatively, the bearing surfaces 28, 32, 30, 34 may be coated with nickel or chromium and such coating may also include a proportion, for example 25%, of a solid lubrication material such as polytetrafluoroethylene or molybdenum disulphide. Instead of incorporating such solid lubrication, the nickel or chromium plating may receive a top coat of titanium nitride. The nickel coating can be hardened, using known methods, to provide a good support for the titanium nitride coating. Similarly, the titanium surfaces can also be hardened, for example by the process known as plasma nitriding, prior to coating. This process involves bombarding the surface of the titanium with nitrogen ions which become absorbed in the surface of the titanium to form titanium nitride. The above-mentioned coating of the titanium with titanium nitride may be performed by the process known as sputter ion plating, in which titanium nitride is applied to the surface of the titanium from an external source.

Figure 2:
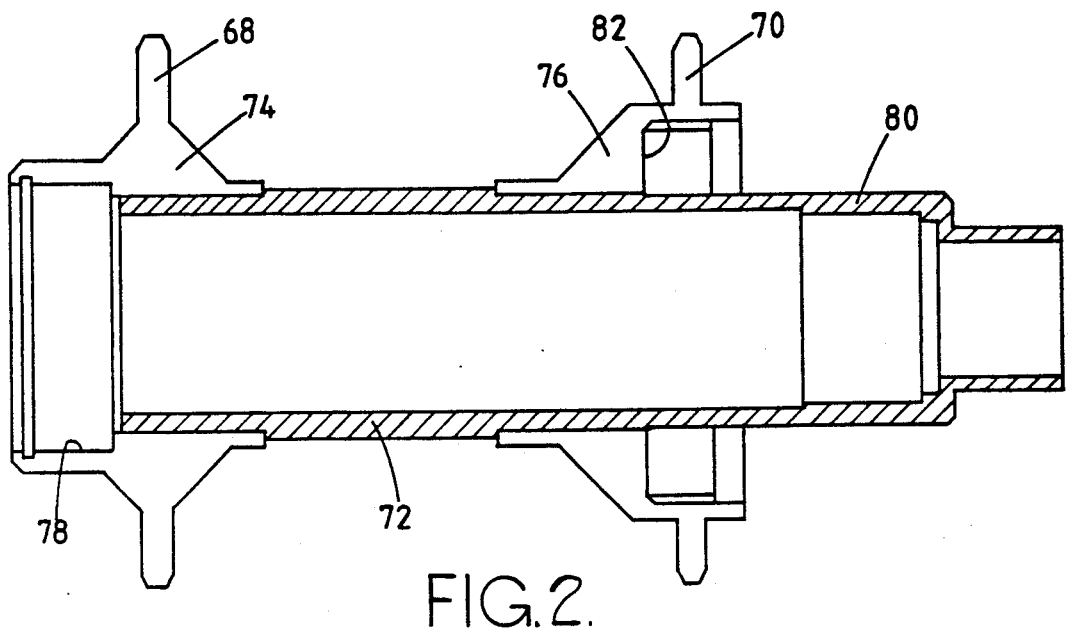
FIG. 2 is a longitudinal section through the body part and sprocket carrier support of an alternative form of hub assembly according to the invention.

FIG. 2 shows an alternative form of body part and sprocket carrier support for use in a hub assembly, which may otherwise be of the kind shown in FIG. 1.

In the FIG. 2 embodiment, the flanges 68 and 70 are separately formed from the central tubular portion 72 of the body part. The flanges may, for example, be formed from aluminium and may be glued, welded or screwed on to the tubular part 72, which may be formed from titanium as in the previous embodiment. In this case the flanges comprises portions of enlarged annular bodies 74 and 76 respectively. The body 74 adjacent one end of the tubular part 72 incorporates an annular recess 78 to receive the ball-bearing set described in relation to FIG. 1, and the enlarged portion 76 adjacent the sprocket carrier 80 is formed with an annular recess 82 to receive the pawl and ratchet uni-directional coupling previously referred to.

The three part assembly shown in FIG. 2 may be lighter and more economic than the all-titanium version of the body part shown in FIG. 1.

Figure 3:
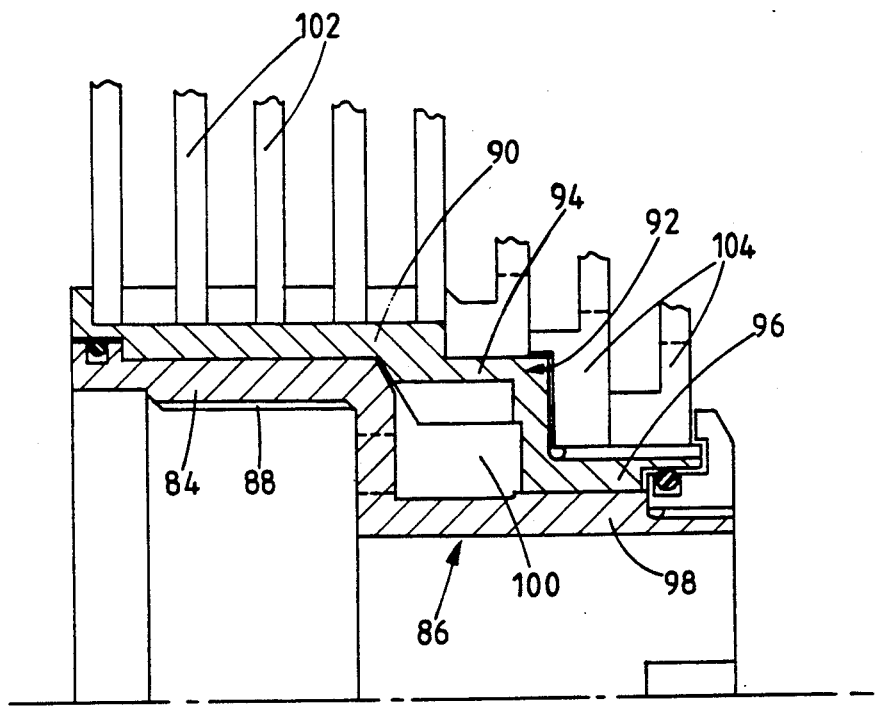
FIG. 3 is a diagrammatic half section through a sprocket assembly, for use in a bicycle hub unit, according to the invention.

In the arrangements so far described the sprocket carrier is integrally formed with the main body part of the hub assembly. FIG. 3 shows an alternative arrangement where the sprocket carrier support is separately formed from the body part and is detachably connected thereto.

In this case the larger diameter portion 84 of the sprocket carrier support 86 is formed with an internal screw thread 88 which enables the sprocket carrier support to be screwed on to an appropriately threaded end portion of the main body part of a hub assembly. Such threaded hub assemblies are commercially available for use with separate sprocket carrier support assemblies already known in the art, which do not incorporate the features of the present invention.

As in the arrangement of FIG. 1, the larger diameter portion 90 of the sprocket carrier 92 is in plain bearing engagement with the outer surface of the larger diameter portion 84 of the sprocket carrier support 86. In this embodiment, however, the sprocket carrier 92 is stepped to provide two portions 94 and 96 which are of smaller diameter than the portion 90. Only the internal surface of the smallest diameter portion 96 is in plain bearing engagement with the outer surface of the smaller diameter portion 98 of the sprocket carrier support. The intermediate portion 94 of the sprocket carrier is spaced from the outer surface of the smaller diameter portion 98 of the sprocket carrier support to provide an annular cavity 100 which, in this embodiment, receives the unidirectional pawl and ratchet mechanism for ensuring that the carrier 92 can only rotate in one direction relative to the support 86.

The sprockets 102, 104 are mounted on the sprocket carrier 92 in similar fashion to that described in relation to FIG. 1.

When the separate sprocket assembly shown in FIG. 3 is used with an existing hub body part, the bearing set adjacent the sprocket assembly will be housed within the body part itself, instead of being housed within the sprocket carrier support as in the arrangement of FIG. 1.

The separate sprocket assembly arrangement of FIG. 3 may be formed from the materials, and have the coatings, of any of the kinds described above in relation to the embodiments of FIGS. 1 and 2.

I claim:

1. A hub assembly for a bicycle wheel comprising; an elongate generally tubular body part having two axially spaced external peripheral flanges for connection to the spokes of the wheel; a generally tubular sprocket carrier support extending from one end of the body part; a generally tubular sprocket carrier surrounding the sprocket carrier support so as to be concentric therewith; the sprocket carrier having external locating means to locate on the carrier, so as to be non-rotatable relatively thereto, a plurality of axially spaced toothed sprockets; bearing means between the sprocket carrier and sprocket carrier support to permit rotation of the carrier relatively to the support; and one-directional coupling means between the carrier and support to permit relative rotation between the carrier and support in only one direction; said bearing means being a plain bearing comprising at least one internal cylindrical plain bearing surface on the sprocket carrier which is in close rotatable sliding engagement with a corresponding external cylindrical plain bearing surface on the sprocket carrier support.

2. A hub assembly according to claim 1, wherein said bearing means comprise two internal cylindrical plain bearing surfaces, of different diameters, on the sprocket carrier, each said bearing surface being in close rotatable sliding engagement with a corresponding external plain bearing surface on the sprocket carrier support.

3. A hub assembly according to claim 1, wherein the sprocket carrier support is integral with the body part and forms an axial extension thereof.

4. A hub assembly according to claim 1, wherein the sprocket carrier support is separately formed from the body part and is in screw-threaded engagement therewith.

5. A hub assembly according to claim 1, wherein at least one of the body part, sprocket carrier support and sprocket carrier is formed from titanium.

6. A hub assembly according to claim 5, wherein at least one of the body part, sprocket carrier support and sprocket carrier is formed from titanium and is coated, at least in part, with titanium nitride.

7. A hub assembly according to claim 5, wherein at least one of the sprocket carrier support and sprocket carrier is formed from titanium and said plain bearing surface thereof is coated with a material selected from titanium nitride, chromium, and nickel.

8. A hub assembly according to claim 7, wherein said plain bearing surface is coated with a material selected from chromium and nickel, and wherein the coating material includes a proportion of a solid lubricating material selected from polytetrafluoroethylene and molybdenum disulphide.

9. A hub assembly according to claim 7, wherein said plain bearing surface is coated with a material selected from chromium and nickel, and wherein there is applied to said coating a top coat of titanium nitride.

10. A hub assembly according to claim 1, wherein there is provided a passageway at least a part of which extends through the elongate generally tubular body part, and first and second bearing receiving means located within the passageway, at axially spaced locations, for receiving and holding respective bearing sets, the second bearing set being located adjacent the sprocket carrier support and having a smaller overall diameter than the first bearing set whereby, during assembly, the smaller second bearing set may be passed through the first bearing receiving means and into and along the passageway for engagement with the second bearing receiving means.

11. A hub assembly according to claim 10, wherein said passageway extends into the sprocket carrier support, and said second bearing set is located within the sprocket carrier support.

12. A hub assembly according to claim 1, wherein said external peripheral flanges are separately formed from the generally tubular body part and are secured thereto.

13. A sprocket assembly, for use in a hub assembly, comprising a generally tubular sprocket carrier support having at one end thereof a screw thread for threaded engagement with one end of a generally tubular body part of a hub assembly; a generally tubular sprocket carrier surrounding the sprocket carrier support so as to be concentric therewith; the sprocket carrier having external locating means to locate on the carrier, so as to be non-rotatable relatively thereto, a plurality of axially spaced toothed sprockets; bearing means between the sprocket carrier and sprocket carrier support to permit rotation of the carrier relatively to the support; and one-directional coupling means between the carrier and support to permit relative rotation between the carrier and support in only one direction; said bearing means being a plain bearing comprising at least one internal cylindrical plain bearing surface on the sprocket carrier in close rotatable sliding engagement with a corresponding external cylindrical plain bearing surface on the sprocket carrier support.

14. A hub assembly for a bicycle wheel comprising an elongate body part, a sprocket carrier support extending from one end of the body part for supporting one or more sprockets for driving the wheel, a passageway extending through the sprocket carrier support and along the length of the body part for receiving an axle, and first and second bearing receiving means located at axially spaced locations within the passageway for receiving and holding respective bearing sets, the second bearing receiving means being located adjacent the sprocket carrier support and being adapted to receive a bearing set having a smaller overall diameter than the bearing set received by the first bearing receiving means so as to enable the smaller bearing set to be passed through the first bearing receiving means when the smaller bearing set is inserted into or removed from the passageway.

* * * * *